Figure 1:
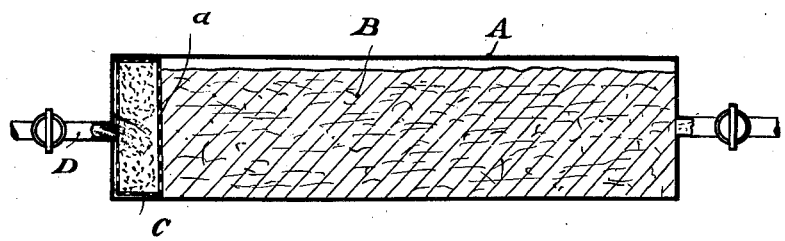

May 26, 1931.　　　　　A. JOSEPH　　　　　1,807,534
PROCESS FOR THE TREATMENT OF A METALLIC, ORGANIC OR OTHER
COMPOUND, OR A GAS, BY A GASEOUS AGENT SERVING
TO ENTER INTO REACTION THEREWITH
Filed July 14, 1927

Inventor
Alfred Joseph
By
Cameron, Kerkam & Sutton
Attorneys.

Patented May 26, 1931

1,807,534

UNITED STATES PATENT OFFICE

ALFRED JOSEPH, OF PARIS, FRANCE, ASSIGNOR TO SOCIETE INTERNATIONALE DES PROCEDES PRUDHOMME HOUDRY, OF PARIS, FRANCE, A LIMITED JOINT-STOCK COMPANY OF FRANCE

PROCESS FOR THE TREATMENT OF A METALLIC, ORGANIC OR OTHER COMPOUND, OR A GAS, BY A GASEOUS AGENT SERVING TO ENTER INTO REACTION THEREWITH

Application filed July 14, 1927, Serial No. 205,817, and in France July 23, 1926.

The subject of the present invention is a process for the transformation of a body, such as a metallic compound, a salt for example, with a view to the extraction of one of its elements, the metal for example, by means of a gaseous agent such as a reducing gas, for instance pure hydrogen or a hydrogen mixture (water gas, etc.), or for the fixation of a gaseous agent on any body.

The invention consists, in principle, in admitting the reducing or other agent into a chamber in which is located the product to be transformed, whilst causing it to pass through a filter constituted by a body capable of constraining it, by an initiation of reaction, to pass from the molecular state to the atomic state. Otherwise stated, the reagent (reducing or other body), before being permitted to enter into reaction with the compound to be transformed, is constrained itself to submit to a transformation which, from the initial state, brings it to the nascent state; it is subjected to the action of an atomizing agent which imparts to it an extraordinarily increased power of reaction.

It is thus for example that a metal such as iron, copper, nickel etc. can be extracted from a compound such as a salt, for instance a sulphate, nitrate or the like by the action of a reducing agent such as hydrogen, capable of combining with the sulphur and oxygen of the compound. At the inlet to the reaction chamber charged with the salt to be transformed, is disposed, in the manner of a filter and in very slight quantity, a body which the reducing gas is constrained to traverse and with which it enters into reaction sufficiently readily and rapidly in order not to form therewith a stable compound. This atomizing filter is a metal or an oxide for example.

The gaseous reducing agent, hydrogen, forms or tends to form, in its passage through the filter, a hydride, which at once decomposes, and this initiation of reaction, at the inlet to the chamber which contains the salt from which it is desired to extract the metal, suffices to transform in passage, the molecular hydrogen into nascent atomic hydrogen. The mass to be treated is thus brought into contact only with a reagent previously rendered atomic.

As shown in the diagram of the annexed drawing, a salt or other material to be treated B (sulphate of iron, of copper, of nickel or the like) may be placed in a reaction chamber A, suitably heated, to a temperature of 200–300° C. for example. At the inlet to the chamber, is located, in a small quantity, the atomizing filter C, that is to say the metallic, oxymetallic or other agent, which the reducing gas such as hydrogen must thus traverse. On passage through the filter it initiates reactions which are incapable of retaining the reagent, but have as a result to cause it to pass completely from the molecular state to the atomic state. All the mass B, from which it is intended to extract the metal, is thus brought into contact only with the reducing agent previously atomized, re-engendered.

The prior passage of the reagent, reducing body or the like, through the atomization filter at the entry, is a means which very advantageously replaces the usual catalytic reactions wherein the materials designed to act on one another are both placed in the presence of a catalytic agent, and wherein one of the agents is atomized in the presence of the entire mass of the material on which it is to act.

The new process is capable of various applications.

Figure 2:
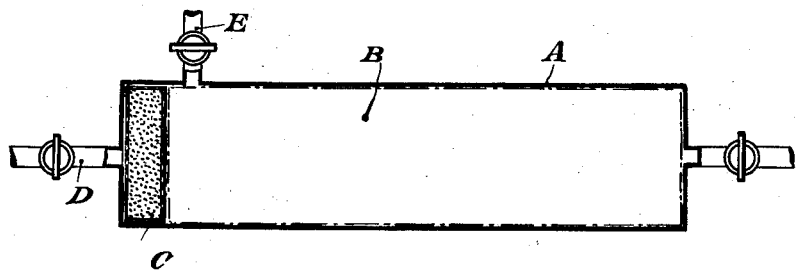

As has been stated above, it can be employed for the extraction of metals from their compounds, such as salts or oxides. It can be employed advantageously in all operations of synthesis or saturation, for example for fixing hydrogen on nitrogen from the atmosphere with a view to the manufacture of ammonia. For this purpose, as shown in the diagram of Fig. 2 a reaction chamber B heated to a temperature of 200–300° C. may be filled with nitrogen, introduced by a pipe E and submit such mass to the action of gaseous hydrogen coming by D and previously transformed into atomic hydrogen by its passage through an atomizing filter C constituted by a metal such as nickel.

This process presents considerable advantages over known processes for the synthetic manufacture of ammonia, wherein hydrogen and nitrogen are together brought, as a mixture, into contact with a catalytic reagent subjected to high pressure.

The new process finds a very advantageous application for desulphurization operations, and particularly for the regeneration of purifying masses of gaseous mixtures intended for the manufacture of synthetic liquid fuels. It is known that the purifying masses are generally constituted by metals or metallic oxides which very rapidly sulphurize and which it is necessary, for this reason, periodically to regenerate. Such regeneration is effected most frequently, by passage of a current of air. The oxygen of the air in acting on the sulphides gives rise to the production of sulphurous acid, and regenerates the metallic oxide, but with the production of a certain quantity of sulphates. This constitutes an inconvenience which increases at each regeneration operation.

The applicant has already proposed to follow the regeneration by air by a regeneration by a hydrogen-containing gas such as water gas. However, with this last process, whilst the regeneration is effected more advantageously, it is nevertheless unadapted to act on the increasing quantities of sulphates which accumulate in the purifying material.

By application of the present invention, the current of hydrogen-containing gas is conducted through an atomizing inlet filter, which has the effect of transforming its molecular hydrogen into atomic hydrogen; this latter easily reduces the sulphate. The reactions are in the main as follows:—

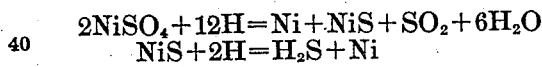

Definitely, the new process can be employed whenever it is desired to submit a body or a compound to the action of a reducing gas, either with a view to the extraction of an element from such body, or with a view to the combination of such body with the gaseous reagent, or with a view to the fixation of the reagent on the body or compound.

The process does not constitute a catalytic reaction proper; it constitutes a previous transformation of a gaseous reagent, by passage through an atomizing filter, before it comes into contact with the elements on which it is to act or with which it is to combine.

Obviously, the atomizing filter C can be employed in the most varied forms: It can, for example, be disposed in a perforated basket, be formed by an agglomerated material, and be placed in immediate contact or the vicinity of the front layer $a$ (Fig. 1) of the material on which the reagent, atomized by it, is to act.

Claims:
1. A process for the reduction of chemical compounds by means of elemental gaseous reducing agents comprising first passing the reducing agent through filtering means containing a metal capable of readily forming an unstable hydride therewith, and thereafter conducting the gas evolved by the breaking down of said unstable hydride out of the presence of said unstable hydride and causing said gas to act on said chemical compound.

2. A process for the hydrogenation of chemical compounds by means of elemental hydrogen comprising first passing a gas containing hydrogen through a filter containing a metal capable of forming an unstable hydride therewith, and thereafter subjecting the chemical compound to be hydrogenated to the action of the hydrogen evolved by the breaking down of the unstable hydride.

3. A process for the hydrogenation of chemical compounds comprising first passing a gas containing elemental hydrogen through a filter containing nickel or the like in finely divided form, maintainnig the temperature and pressure conditions such that the nickel hydride thus formed is unstable and continually breaks down with the evolution of nascent hydrogen, and causing the hydrogen so evolved to come into intimate contact with said compound to be hydrogenated.

4. A process for the extraction of a metal from its compounds by means of elemental hydrogen which comprises first passing a gas containing hydrogen over a metal capable of forming an unstable hydride therewith, and then conducting the gas containing the hydrogen evolved by breaking down said hydride out of the presence of said hydride and in contact with a metal compound whereby the metal is extracted therefrom.

In testimony whereof I have signed this specification.

ALFRED JOSEPH.